United States Patent [19]

Deguchi et al.

[11] Patent Number: 5,627,540
[45] Date of Patent: *May 6, 1997

[54] REMOTE CONTROL SYSTEM HAVING FULL-FUNCTION AND ABBREVIATED-FUNCTION REMOTE CONTROL UNITS

[75] Inventors: Takashi Deguchi, Kusatsu; Makoto Hori, Ohmihachiman; Morihiro Nakayama; Hiroyuki Unida, both of Kusatsu, all of Japan

[73] Assignee: Matsushita Electric Industrial Co., Ltd., Osaka-fu, Japan

[*] Notice: The term of this patent shall not extend beyond the expiration date of Pat. No. 5,461,382.

[21] Appl. No.: 445,100

[22] Filed: May 19, 1995

Related U.S. Application Data

[63] Continuation of Ser. No. 41,892, Apr. 2, 1993, Pat. No. 5,461,382, which is a continuation of Ser. No. 505,655, Apr. 6, 1990.

[30] Foreign Application Priority Data

Apr. 7, 1989 [JP] Japan ..................................... 1-88881

[51] Int. Cl.$^6$ .................................................... H03J 9/06
[52] U.S. Cl. ............................................................ 341/176
[58] Field of Search ...................................... 341/174, 176; 379/102; 455/352; 340/825.72

[56] References Cited

U.S. PATENT DOCUMENTS

| | | | |
|---|---|---|---|
| 4,626,848 | 12/1986 | Ehlers | 340/825.69 |
| 4,734,871 | 3/1988 | Tsunoda et al. | 364/557 |
| 4,893,240 | 1/1990 | Karkouti | 364/424.05 |
| 5,461,382 | 10/1995 | Deguchi et al. | 341/176 |

FOREIGN PATENT DOCUMENTS 2182790  5/1987  United Kingdom ............... H03J 9/06

*Primary Examiner*—Thomas M. Heckler
*Assistant Examiner*—Dennis M. Butler
*Attorney, Agent, or Firm*—Wenderoth, Lind & Ponack

[57] ABSTRACT

A remote control system includes a first remote control unit having complete functional capabilities and a second remote control unit having simplified and abbreviated functional capabilities. An apparatus is controlled in a detailed manner by the first remote control unit. For example, the operational mode and timer settings are set by the first remote control unit. On the other hand, the second remote control unit is limited to activating and deactivating the apparatus and/or the timer of the apparatus.

6 Claims, 5 Drawing Sheets

REMOTE CONTROL SYSTEM HAVING FULL-FUNCTION AND ABBREVIATED-FUNCTION REMOTE CONTROL UNITS

CROSS-REFERENCE TO RELATED CASES

This is a Continuation of Ser. No. 08/041,892, filed Apr. 2, 1993 and now U.S. Pat. No. 5,461,382, which in turn was a Continuation of Ser. No. 07/505,655, filed Apr. 6, 1990 and now abandoned.

BACKGROUND OF THE INVENTION

1. Field of the Invention

The wireless remote control device is now used to control various electric appliances including air conditioners and audio-visual equipment. However, the various operating functions of the device have become more complicated in recent years, causing difficulties for the user in handling the device.

The present invention relates to a remote control system which is designed to permit convenient operation of an apparatus using a plurality of remote control devices.

2. Description of the Related Art

It has been a conventional practice to provide every one appliance or apparatus with one remote control device. In recent years, however, it has become known to provide a single apparatus with both a remote control device with full functional capabilities and a remote control device with only simplified and abbreviated functional capabilities.

In accordance with the development of sophisticated remote control functions, it has also become known to indicate and set the operating state of the apparatus using a remote control device. In the case where plural such remote control devices are provided for an apparatus, an indication by each remote control device may sometimes be different from the operating state of the apparatus itself. To avoid such inconvenience in such a situation, therefore, efforts have been given up to indicate the operating state of the apparatus using plural remote control devices.

SUMMARY OF THE INVENTION

Accordingly, an essential object of the present invention is to provide a remote control system, achieving a fully-fitted remote control with full functions able to indicate the operating state of an apparatus, with improving the convenience in handling thereof.

In accomplishing the above-described object, according to the present invention, a remote control device is provided with a first remote control transmitter which consists of a setting means for setting the apparatus operation content, an ON/OFF means and a transmitting means, a second remote control transmitter which consists of an ON/OFF means and a transmitting means, and a receiver means.

The receiver means is connected with a signal reading means, an instructing means and a memory means. The memory means stores the apparatus operation content determined by the setting means and transmitted from the first remote control transmitter. When the memory means receives an operation instruction from the ON/OFF means and transmitting means of the second remote control transmitter, the memory means starts to operate the apparatus based on the operation content stored therein.

Prior to the end of operation by the first remote control transmitter, a specific initial value is set and stored in the memory means.

According to the present invention, a signal transmitted by the transmitting means of the first remote control transmitter is different from a signal transmitted by the transmitting means of the second remote control transmitter.

In a second aspect of the present invention, the remote control device is comprised of a first remote control transmitter which consists of a timer content setting means, a timer ON/OFF means and a transmitting means, a second remote control transmitter which consists of a timer ON/OFF means and a transmitting means, and a receiver means.

The receiver means is connected to a signal reading means, an operation instructing means and a memory means. The memory means stores the content of a timer set by the setting means and transmitted from the first remote control transmitter. When the memory means receives an instruction for setting the timer from the timer ON/OFF means of the second remote control transmitter, the memory means sets the timer based on the content stored therein.

The receiver means and signal reading means are connected to a sound generating means. When a signal from the transmitting means of the first remote control transmitter and second remote control transmitter is received, the sound generating means generates a signal sound. On the other hand, when a timer setting signal is received from the timer ON/OFF means and transmitting means of the second remote control transmitter before the end of setting of the timer by the first remote control transmitter, the sound generating means generates a specified different signal sound.

Signals transmitted from the transmitting means of the first remote control transmitter are different from signals transmitted from the transmitting means of the second remote control transmitter.

Furthermore, the first remote control transmitter is provided at least with a setting means for setting the operation content, an ON/OFF means, a timer content setting means, a timer ON/OFF means and a transmitting means. At the same time, the second remote control transmitter is provided at least with an ON/OFF means, a timer ON/OFF means and a transmitting means.

Accordingly, in the present invention, the operating state of the apparatus and that of the timer can be set in a detailed manner in advance using the first remote control transmitter which is completely equipped with full functional capabilities. On the other hand, most of the general ON/OFF control of the apparatus and timer is effected using the second remote control transmitter which has abbreviated functional capabilities. Therefore, even a highly-sophisticated apparatus can be handled in a simpler manner.

BRIEF DESCRIPTION OF THE DRAWINGS

These and other objects and features of the present invention will become apparent from the following description taken in conjunction with one preferred embodiment thereof with reference to the accompany drawings, in which.

DESCRIPTION OF ONE PREFERRED EMBODIMENT

Figure 1A:
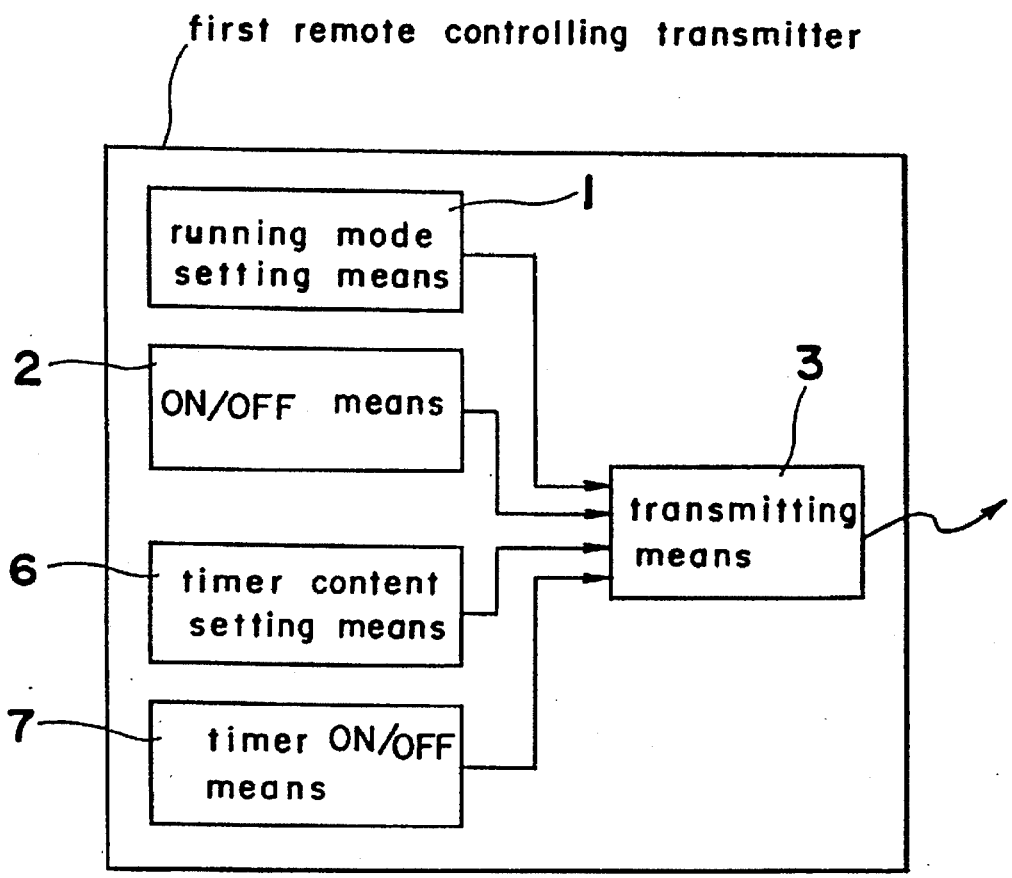
FIGS. 1(a)–1(c) are block diagrams showing the structure of a remote control device according to one preferred embodiment of the present invention.

Before the description of the present invention proceeds, it is to be noted here that like parts are designated by like reference numerals throughout the accompanying drawings.

A remote control device according to one preferred embodiment of the present invention will be described hereinbelow with reference to FIGS. 1–4.

An air conditioner apparatus is given as an example to explain the operation of the remote control device.

Figure 1B:
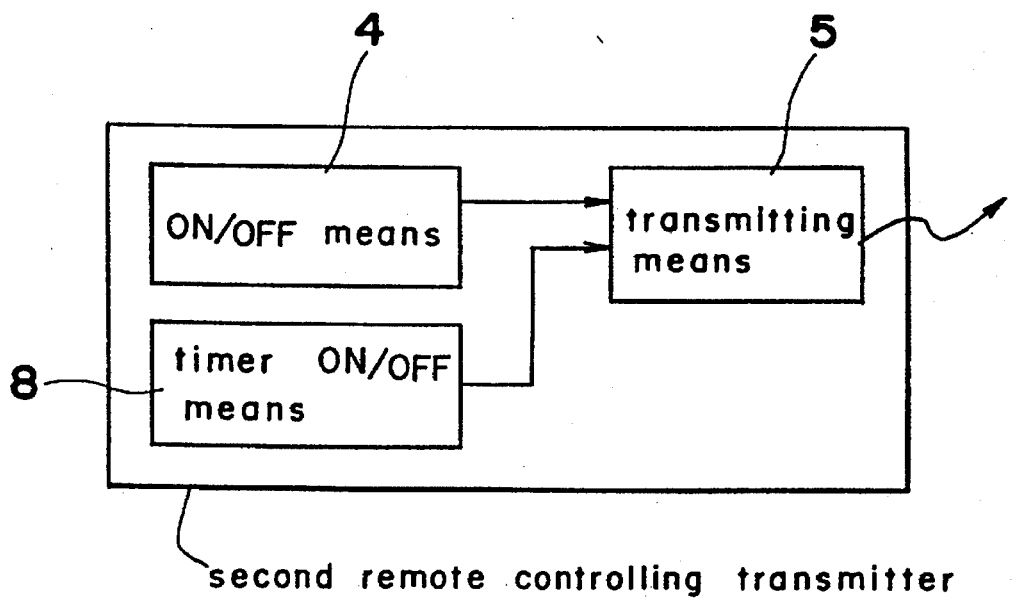
Figure 1:
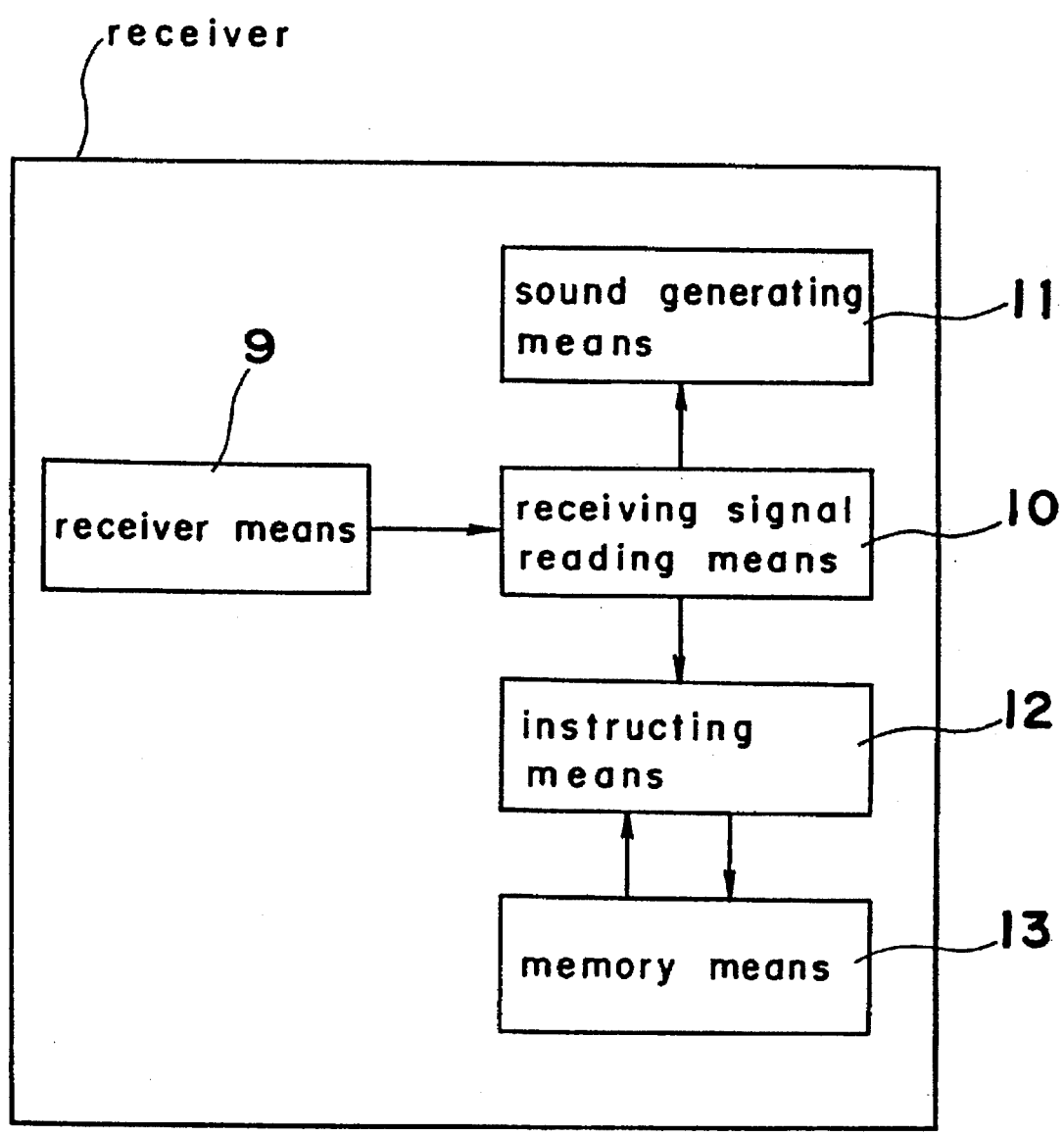

The structure of the remote control device is shown by a block diagram of FIG. 1.

In order to activate and stop the operation of an equipment, a first remote control transmitter of FIG. 1(a) is provided with a running mode setting means 1 which sets the running mode of the equipment, i.e., cooling or heating, temperature, wind velocity, etc., an ON/OFF means 2 for instructing the apparatus to operate or stop operating, and a transmitting means 3. A second remote control transmitter shown in FIG. 1(b) is provided with an ON/OFF means 4 and a transmitting means 5. Specifically, the first remote control transmitter transmits signals including detailed instructions for operation of the apparatus, while the second remote control transmitter transmits signals only to stop or activate the apparatus operation.

For operating the apparatus using a timer, the first remote control transmitter further includes a timer content setting means 6 which selectively turns on and off the timer and sets an operating time, i.e., start and completion times of the timer, a timer ON/OFF means 7 for setting or releasing the timer, and the transmitting means 3. The second remote control transmitter further includes a timer ON/OFF means 8 and the transmitting means 5 in order to operate the apparatus using the timer. The first remote control transmitter transmits signals to cause or cancel the timer controlled apparatus operation, including setting the operating time of the apparatus. On the other hand, the second remote control transmitter only transmits signals to cause or cancel the timer controlled apparatus operation.

FIG. 1(c) shows a block diagram of a receiver. Signals from the transmitting means 3 and 5 of the first and second remote control transmitters are received by a receiver means 9 and then read by a receiving signal reading means 10. At this time, a sound generating means 11 generates a signal sound. Moreover, after the receiving signal is read by the reading means 10, it is sent to an instructing means 12 which, if the receiving signal is from the first remote control transmitter, consequently instructs the apparatus to operate in conformity with the content of the signal, and which stores in a memory means 13 the operation content. If the receiving signal is from the second remote control transmitter, the instructing means 12 retrieves the stored operation content from the memory means 13, and operates the apparatus in accordance with the stored operation content.

In the case where the receiving signal from the second remote control transmitter is an operation instruction, the apparatus will operate in accordance with the content stored in the memory means 13. However, if the apparatus has not completed the operation initiated by the first remote control transmitter, a specified initial value is stored in advance in the memory means 13 based on which the apparatus is operated. After the operation by the first remote control transmitter is completed, the initial value set in the memory means 13 is rewritten.

In the case where the receiving signal from the second remote control transmitter is a timer setting instruction, the apparatus operation is set with a timer value stored in the memory means 13. However, if the apparatus has not yet completed the operation set by the first remote control transmitter, it is unable to set the apparatus operation with the timer value, whereby a particular alarm is generated instead from the sound generating means.

Figure 2B:
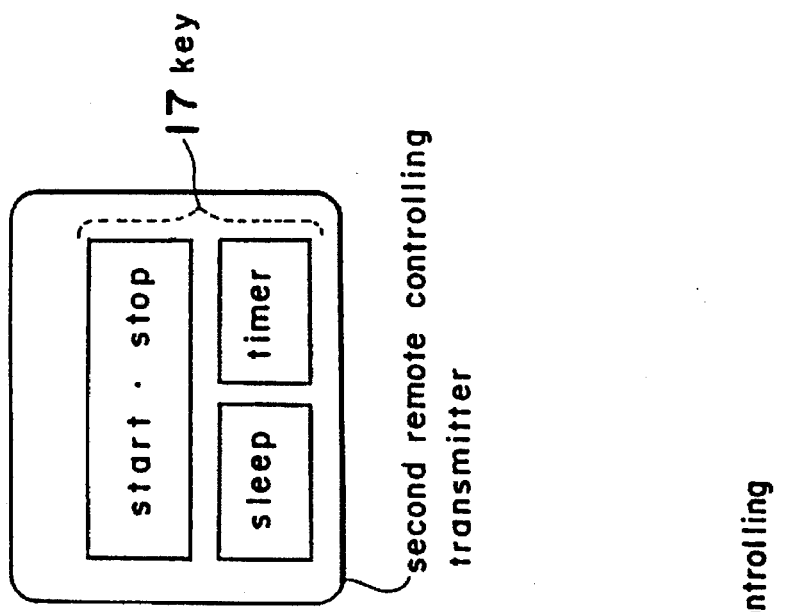
FIGS. 2(a) and 2(b) are front elevational views of the remote control device.
Figure 2A:
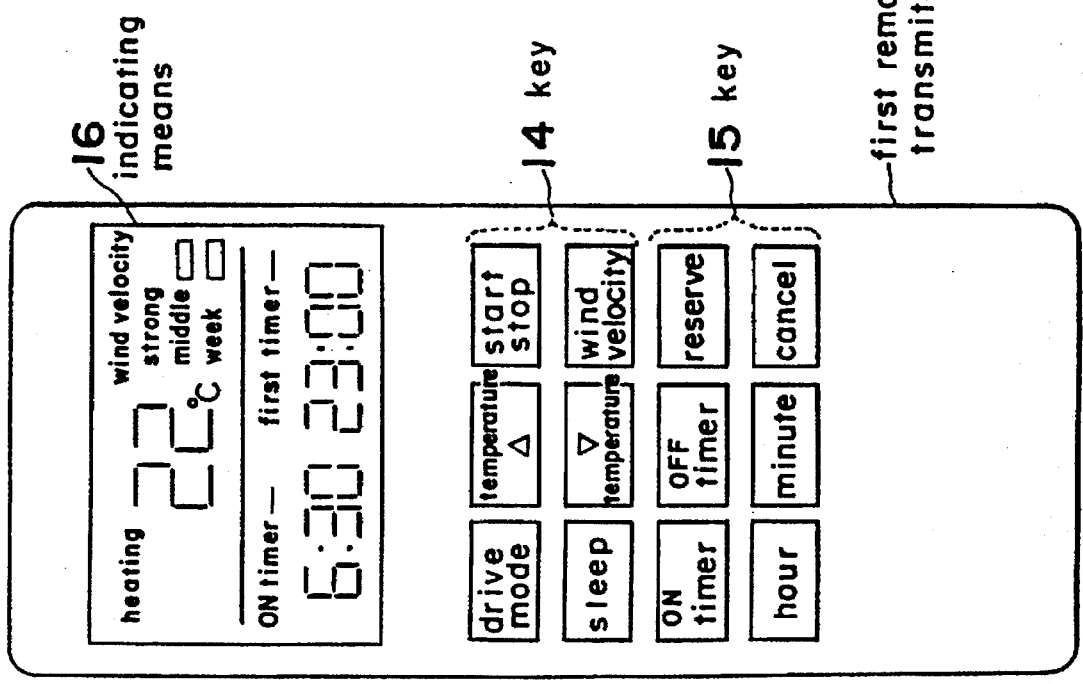

FIG. 2 shows a front elevational view of a remote control device according to the one embodiment of the present invention, FIG. 2(a) showing the first remote control transmitter and FIG. 2(b) showing the second remote control transmitter. The first remote control transmitter is provided with manipulation keys 14 related to the operation content of the apparatus, that is, the operating mode of the equipment such as heating or cooling, temperature, wind velocity and the like, and manipulation keys 15 related to the timer, specifically, start, stop, time, minute, reservation and cancellation of the timer. In addition, an indicating means 16 is provided to indicate the operation content set for the apparatus, so that the user can operate the apparatus and set the timer correctly through consultation of the indication means 16. The indicating means 16 may be a liquid crystal display.

When the first remote control transmitter transmits data in accordance with the set indicated content, it transmits a plurality of both data related to the apparatus and data related to the timer as they are set at one time in order that an indication by the remote control device is coincident with the running content of the equipment.

The second remote control transmitter is provided with a key 17 which is used to start or stop the apparatus operation, or to operate the timer, etc. for transmitting fixed data.

The second remote control transmitter may be equipped with an additional function using, for example, a sleep key.

FIG. 3 shows the structure of transmitting data for activating and stopping the apparatus operation using the remote control device according to the preferred embodiment of the present invention.

Figure 3A:
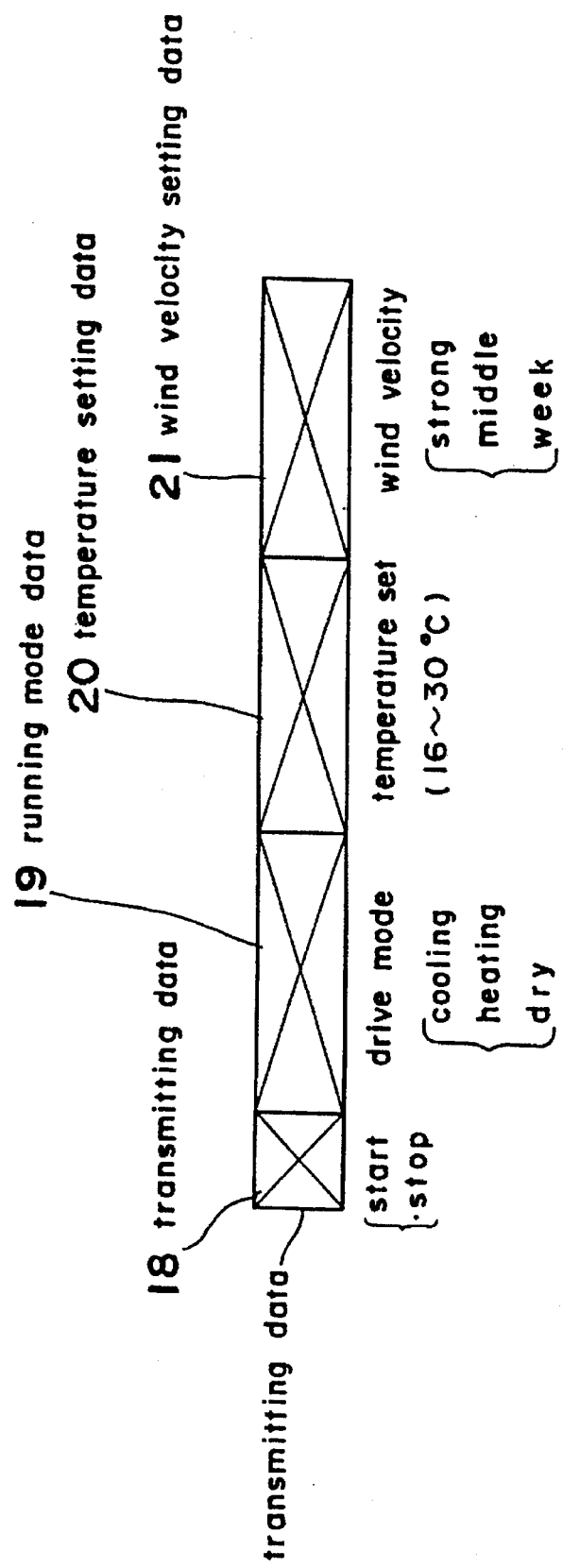
FIGS. 3(b) and 3(b) are structural views of transmitting data for activating and stopping of an apparatus using the remote control device, respectively.

FIG. 3(a) exemplifies a transmitting data from the transmitting means of the first remote control transmitter, which is composed of a run/stop data 18, a running mode data 19, a temperature setting data 20 and a wind velocity setting data 21. The running mode data 19, temperature setting data 20 and wind velocity setting data 21 are respectively a preset data showing one value. The run/stop data 18 is a fixed reversing data for causing the receiver to operate or stop upon each reception thereof. Since many remote control devices are used in the apparatus, it is impossible for the remote control devices to determine whether the apparatus operates or stops if the run/stop data is not a reversing data. Accordingly, the first remote control transmitter transmits all the data both for operating the apparatus and for stopping the apparatus.

Figure 3B:
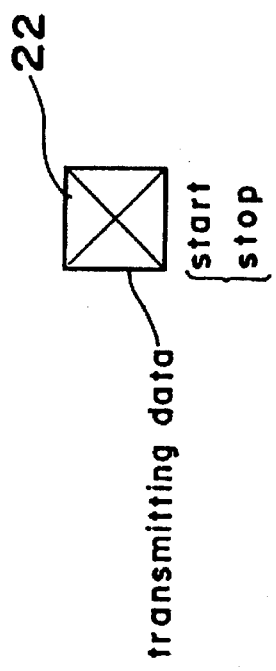

FIG. 3(b) is a transmitting data from the second remote control transmitter which is a reversing data. The structure of the data is simplified because the data is composed only of a run/stop data 22.

FIG. 4 shows the structure of transmitting data for reservation or cancellation of the timer in the remote control device according to the one preferred embodiment of the present invention.

Figure 4A:
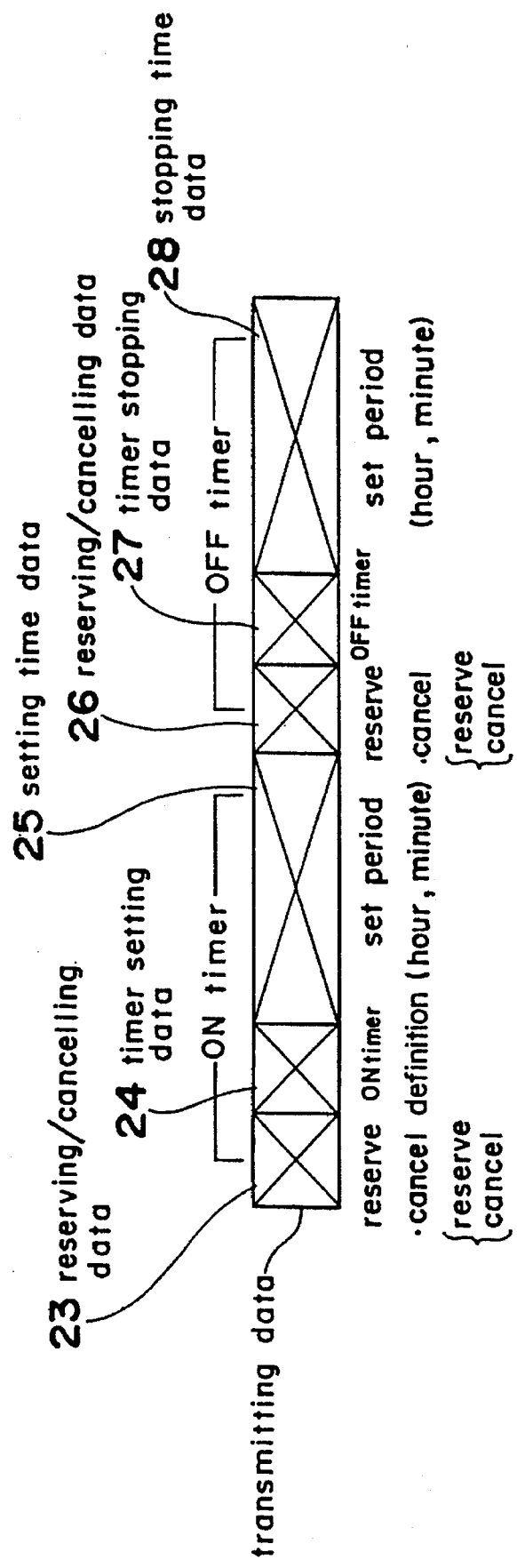
FIGS. 4(a) and 4(b) are structural views of transmitting data for reservation and cancellation of a timer using the remote control device, respectively.

FIG. 4(a) is one example of a transmitting data from the transmitting means of the first remote control transmitter. The data is composed of a reserving/canceling data 23, a timer setting data 24 and a setting time data 25 when the timer is to be turned ON, a reserving/canceling data 26, a timer stopping data 27 and a stopping time data 28 when the timer is to be turned OFF. All of the transmitting data are preset data respectively showing one set value.

Figure 4B:
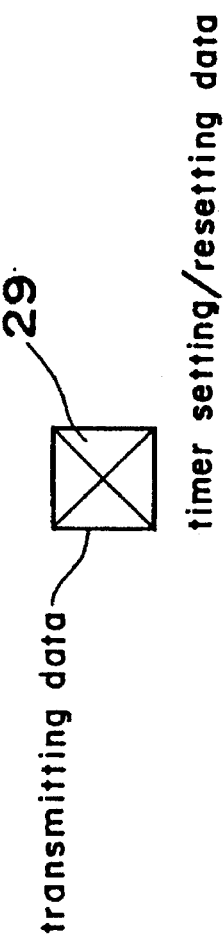

FIG. 4(b) is a transmitting data from the second remote control transmitter which is a reversing data. The structure of the data is simplified since the data is composed of a timer setting/resetting data 29 only.

As is made clear from the foregoing description, according to the present invention, since the remote control device is formed of a combination of the first remote control transmitter which can set the apparatus operation and timer in a detailed manner and the second remote control transmitter which is able to read the memory stored within the apparatus, it becomes possible to handle even a highly-advanced apparatus with ease.

Further, since the initial value is set in advance, the apparatus can start running smoothly using the second remote control transmitter even at the early conduction stage thereof.

Although the timer cannot be set with an initial value, an alarm sound is arranged to be generated before the end of operation set by the first remote control transmitter, thereby avoiding a mistake of the user.

The transmitting data of the second remote control transmitter can be remarkably simplified.

Moreover, either or both of the first and second remote control transmitters can be equipped with minimum functional capabilities.

Although the present invention has been fully described by way of example, it is to be noted that various changes and modifications are apparent to those skilled in the art. Therefore, such changes and modifications should be construed as included within the scope of the invention unless they depart therefrom.

What is claimed is:

1. A remote control system for controlling the operation of an apparatus, comprising:

a full-function remote control unit including a timer content setting means for setting timing parameters of a timer which is associated with the apparatus and which controls the operation of the apparatus in accordance with set timing parameters when the timer is activated, a first timer ON/OFF means for activating and deactivating the timer associated with the apparatus, and a first transmitting means for transmitting a first remote control signal in accordance with said timer content setting means and said first timer ON/OFF means;

an abbreviated-function remote control unit including a second timer ON/OFF means for activating and deactivating the timer associated with the apparatus, and a second transmitting means for transmitting a second remote control signal in accordance with said first timer ON/OFF means, and being devoid of a timer content setting means for setting the timing parameters of the timer associated with the apparatus; and, a receiver means for receiving said first and second remote control signals from said full-function remote control unit and said abbreviated-function remote control unit, respectively, and for controlling the timer associated with the apparatus in accordance with said first and second remote control signals to thereby control the operation of the apparatus.

2. A remote control system as recited in claim 1, wherein said receiver means includes:

a received signal reading means for reading a data content contained in said first and second remote control signals;

a memory means for storing data, which has been read by said received signal reading means, contained in said first remote control signal denoting said set timing parameters of the timer associated with the apparatus; and operation instruction means for controlling the timer associated with the apparatus in accordance with said data content contained in said first and second remote control signals and read by said received signal reading means, wherein said operation instruction means controls the timer based on said data denoting said set timing parameters stored in said memory means when said second remote control signal is received and contains data denoting activation of the timer.

3. A remote control system as recited in claim 1, wherein said receiver means includes:

a received signal reading means for reading a data content contained in said first and second remote control signals; and, a sound generating means for generating a first audible sound when at least one of said first and second remote control signals is received, and for generating a second audible sound which is audibly distinguishable from said first audible sound when said second remote control signal is received and contains data denoting activation of the timer prior to the expiration of a time period established by the data content of a previously received first remote control signal by which the timer is already activated.

4. A remote control system as recited in claim 1, wherein a data format of said first remote control signal is different than a data format of said second remote control signal.

5. A remote control system as recited in claim 2, wherein a data format of said first remote control signal is different than a data format of said second remote control signal.

6. A remote control system as recited in claim 3, wherein a data format of said first remote control signal is different than a data format of said second remote control signal.

* * * * *